United States Patent
Bria et al.

(10) Patent No.: US 11,197,245 B2
(45) Date of Patent: Dec. 7, 2021

(54) SYSTEM AND METHOD FOR PROVIDING COMMUNICATION RULES BASED ON A STATUS ASSOCIATED WITH A BATTERY OF A DEVICE

(71) Applicant: Telefonaktiebolaget LM Ericsson (publ), Stockholm (SE)

(72) Inventors: Aurelian Bria, Nacka (SE); Amin Azari, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/643,698

(22) PCT Filed: Sep. 26, 2017

(86) PCT No.: PCT/SE2017/050933
§ 371 (c)(1),
(2) Date: Mar. 2, 2020

(87) PCT Pub. No.: WO2019/066688
PCT Pub. Date: Apr. 4, 2019

(65) Prior Publication Data
US 2020/0213949 A1     Jul. 2, 2020

(51) Int. Cl.
*H04W 52/02* (2009.01)
*H04W 4/70* (2018.01)

(52) U.S. Cl.
CPC ......... *H04W 52/0261* (2013.01); *H04W 4/70* (2018.02); *H04W 52/0222* (2013.01)

(58) Field of Classification Search
CPC .............. H04W 4/70; H04W 52/0222; H04W 52/0261

USPC .......................................................... 370/311
See application file for complete search history.

(56) References Cited

U.S. PATENT DOCUMENTS

| | | | |
|---|---|---|---|
| 6,973,335 B2* | 12/2005 | Ganton | H04W 52/00 455/573 |
| 2010/0302980 A1 | 12/2010 | Ji et al. | |
| 2011/0211466 A1 | 9/2011 | Kazmi | |
| 2014/0349660 A1 | 11/2014 | Abdalla | |

(Continued)

OTHER PUBLICATIONS

"Digital cellular telecommunications system (Phase 2+) (GSM)", ETSI TS 123 203 V13.6.0; Universal Mobile Telecommunications System (UMTS); LTE; Policy and charging control architecture (3GPP TS 23.203 version 13.6.0 (Release 13), Mar. 2016, pp. 1-243.

(Continued)

*Primary Examiner* — Gbemileke J Onamuti
(74) *Attorney, Agent, or Firm* — Murphy, Bilak & Homiller, PLLC

(57) ABSTRACT

A system and method for providing communication rules based on a status associated with a battery of a device such as a user equipment. In one embodiment, an apparatus (300, 600), and related method (1100, 1200), operative to communicate with a user equipment (200, 700) in a communication system (100) is configured to receive a status including a remaining charge associated with a battery (240) of the user equipment (200, 700). The apparatus (300, 600) is also configured to provide communication rules for the user equipment (200, 700) to manage a utilization of the battery (240) based on the status of the battery (240).

21 Claims, 9 Drawing Sheets

(56) References Cited

U.S. PATENT DOCUMENTS

2016/0219487 A1 7/2016 Khawer et al.
2016/0286015 A1* 9/2016 Kim .................... G06F 1/1684
2019/0268226 A1* 8/2019 Kovacs ............... H04L 41/0816

OTHER PUBLICATIONS

Aghmadi, Ali, et al., "A MTC Traffic Generation and ACI Priority-First Scheduling Algorithm over LTE", Wireless Networks and Mobile Communications (WINCOM), 2015 International Conference on IEEE, 2015, pp. 1-6.
Cisco, "The Zettabyte Era: Trends and Analysis", Cisco Visual Networking Index (VNI); White Paper, 2016, pp. 1-31.
Gotsis, Antonis G., et al., "M2M Scheduling Over LTE", Wireless World Research Forum; IEEE Vehicular Technology Magazine, Sep. 2012, pp. 34-39.
Mehaseb, M. A., "Classification of LTE Uplink Scheduling Techniques: An M2M Perspective", IEEE Communications Surveys & Tutorials, vol. 18, No. 2, Second Quarter 2016, pp. 1310-1335.
"3GPP TR 45.820 V13.1.0", 3rd Generation Partnership Project; Technical Specification Group GSM/EDGE Radio Access Network; Cellular system support for ultra-low complexity and low throughput Internet of Things (CIoT) (Release 13), Nov. 2015, pp. 1-145.
Wang, Kun, et al., "Energy-Efficiency of LTE for Small Data Machine-to-Machine Communications", IEEE Icc 2013 -Selected Areas in Communications Symposium, 2013, pp. 4120-4124.

* cited by examiner

SYSTEM AND METHOD FOR PROVIDING COMMUNICATION RULES BASED ON A STATUS ASSOCIATED WITH A BATTERY OF A DEVICE

TECHNICAL FIELD

The disclosure relates to communication systems and, more particularly, to a system and method for providing communication rules based on a status associated with a battery of a device.

BACKGROUND

The Narrowband Internet of Things ("NB-IoT") is a narrowband system developed for the cellular Internet of Things by the Third Generation Partnership Program ("3GPP"). The system is based on existing Long Term Evolution ("LTE") systems, and addresses improved network architecture and coverage for substantial number of devices with characteristics such as lower throughput (e.g., two kilobits per second ("kbps")), lower delay sensitivity (e.g., 10 seconds), lower cost (e.g., below 5 dollars) and lower power consumption (e.g., battery life of 10 years).

It is envisioned that each cell (about one square kilometer) in this system can serve thousands (e.g., 50,000) of devices such as sensors, meters, actuators, and other devices. In order to make use of an existing spectrum such as Global System for Mobile Communications ("GSM"), a fairly narrow bandwidth (e.g., 180 kilohertz ("kHz"), which may be similar to the LTE Physical Resource Block ("PRB")) has been adopted for NB-IoT technology. The entire (or a substantial amount of) NB-IoT traffic can be contained within 200 kHz or one physical resource block, which may be 12 subcarriers of 15 kHz each (in NB-IoT, this is referred to as one carrier or one PRB).

Existing cellular infrastructures have been designed for a limited set of services including voice/video calling, and web surfing. Each connected device (e.g., a smartphone) may transmit/receive different types of traffic such as web or voice traffic. To satisfy the quality-of-service ("QoS") requirements of each service, the 3GPP LTE has defined some quality class identifiers ("QCIs"), and provide a QCI to each traffic type, as described in the European Telecommunications Standards Institute Technical Specification ("ETSI TS") 123 203, entitled "Digital cellular telecommunications system (Phase 2+) (GSM); Universal Mobile Telecommunications System (UMTS); LTE; Policy and charging control architecture (3GPP TS 23.203 version 13.6.0 Release 13)," (2016-03), which is incorporated herein by reference.

The QCIs (see, e.g., Table 6.1.7: Standardized QCI characteristics, pages 47-48 of the above referenced document) are used in the scheduling procedures for prioritizing different types of traffic for uplink/downlink service. The existing QCIs have been mostly designed either (i) to guarantee a traffic-dependent bitrate for data-hungry services, or (ii) to provide ultra-low latency communications for ultra-high priority services. The existing QCIs have been adapted for downlink, while a large part of IoT communication is on uplink, and consists of a substantial number of short-lived sessions. The existing QCIs are not tailored to support the connection establishment phase (i.e., to associate special random access channel ("RACH") resources for critical QCIs to reduce energy loss in contentions) and uplink scheduled transmissions (i.e., the amount of allocated resources, priority in resource allocation, and signal-to-noise ratio ("SNR") budget).

Apart from serving machine-type communications ("MTC") along human-oriented communications ("HoC") traffic, systems like NB IoT have been addressed in LTE Rel. 13, in which it has been proposed to allocate a narrow frequency band to MTC, divide this band further to narrowband sub-channels, and allocate them to MTC devices, as described in the 3GPP Technical Requirements Document ("TR") 45.820, entitled "Technical Specification Group GSM/EDGE Radio Access Network; Cellular system support for ultra-low complexity and low throughput Internet of Things (CIoT)," v13.1.0 (2015-11), which is incorporated herein by reference. MTC scheduling in NB-IoT is done in the same way as in previous LTE releases (i.e., based on the allocated QCIs to the traffic). However, energy consumption in NB-IoT is expected to decrease significantly due to the extra available link budget in narrowband communications. Nonetheless, with the proliferation of user equipment such as MTC devices the scheduling of communication resources therefor will need to be addressed going forward.

SUMMARY

These and other problems may be generally solved or circumvented, and technical advantages may be generally achieved, by advantageous embodiments that, for example, include a system and method for providing communication rules based on a status associated with a battery of a device such as a user equipment. In one embodiment, an apparatus, and related method, operative to communicate with a user equipment in a communication system is configured to receive a status including a remaining charge associated with a battery of the user equipment. The apparatus is also configured to provide communication rules for the user equipment to manage a utilization of the battery based on the status of the battery.

In another embodiment, an apparatus, and related method, in a communication system is configured to provide a status including a remaining charge associated with a battery of the apparatus. The apparatus is also configured to execute communication rules to manage a utilization of the battery based on the status of the battery.

The foregoing has outlined rather broadly the features and technical advantages of the present examples in order that the detailed description that follows may be better understood. Additional features and advantages of various examples will be described hereinafter, which form the subject of the claims of the invention. It should be appreciated by those skilled in the art that the conception and specific embodiments disclosed may be readily utilized as a basis for modifying or designing other structures or processes for carrying out the same purposes of different embodiments. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules for managing a remaining charge in a battery in a user equipment such as an MTC device in a communication system. While the principles will be described in the environment of a Third Generation Partnership Program ("3GPP") Long Term Evolution ("LTE") communication system, any wireless communication environment is well within the broad scope of the present disclosure.

Figure 1:
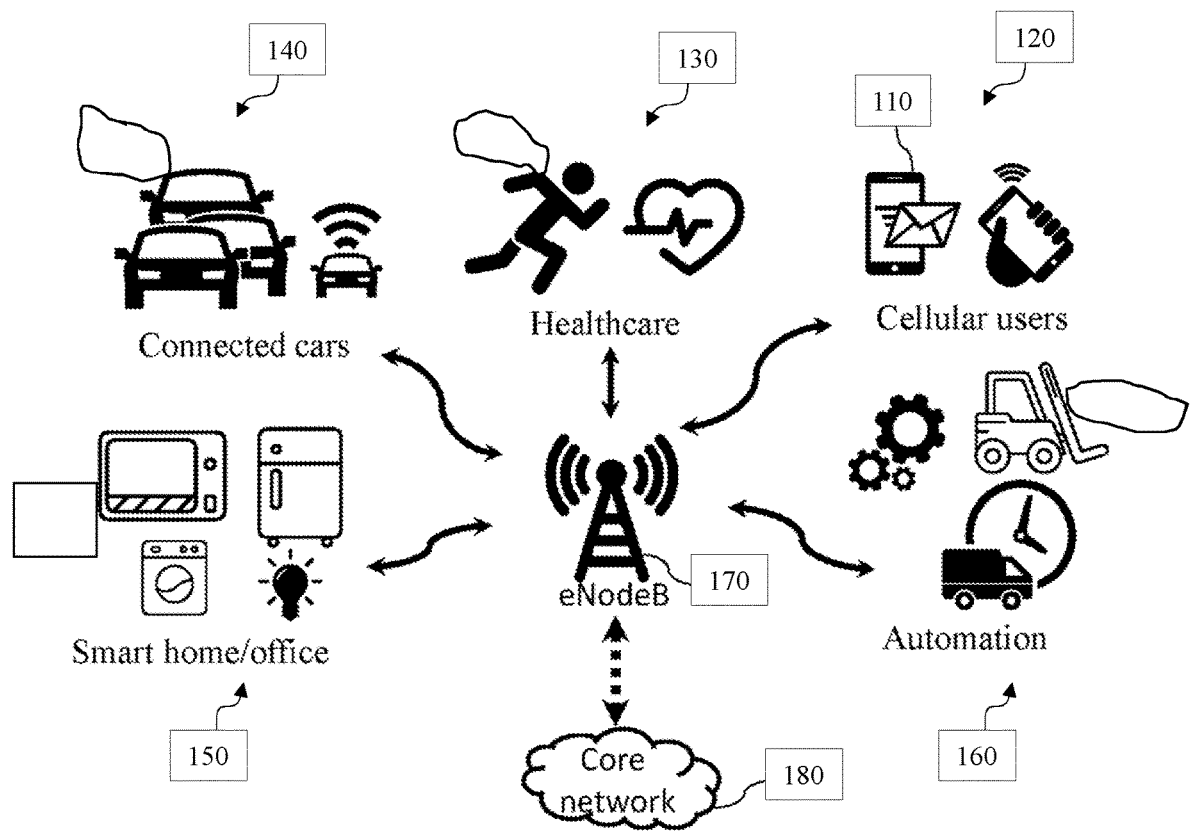
FIGS. 1 to 3 illustrate diagrams of embodiments of a communication system and portions thereof.
Figure 2:
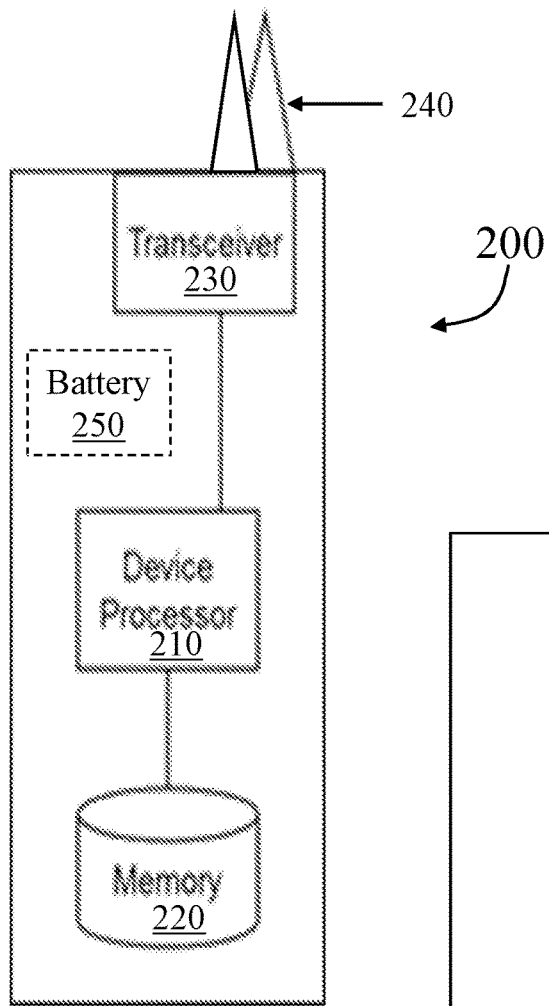
Figure 3:
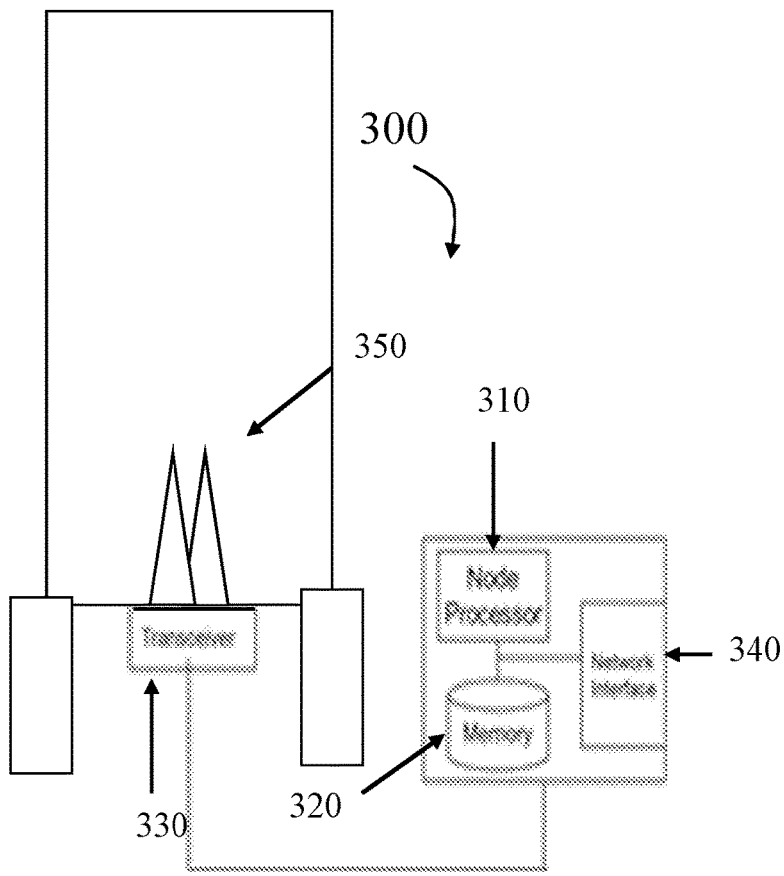

Referring initially to FIGS. 1 to 3, illustrated are diagrams of embodiments of a communication system 100, and portions thereof. As shown in FIG. 1, the communication system 100 includes one or more instances of wireless communication devices (one of which is designated 110, and also referred to as user equipment ("UE")).

The wireless communication device 110 may be any device that has an addressable interface (e.g., an Internet protocol ("IP") address, a Bluetooth identifier ("ID"), a near-field communication ("NFC") ID, etc.) and/or is intended for accessing services via an access network and configured to communicate over the access network via the addressable interface. For instance, the wireless communication device 110 may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The wireless communication device 110 may be a portable, pocket-storable, hand-held, computer-comprised, or vehicle-mounted mobile device, enabled to communicate voice and/or data, via a wireless or wireline connection. A wireless communication device 110 may have functionality for performing monitoring, controlling, measuring, recording, etc., that can be embedded in and/or controlled/monitored by a central processing unit ("CPU"), microprocessor, ASIC, or the like, and configured for connection to a network such as a local ad-hoc network or the Internet. A wireless communication device 110 may have a passive communication interface, such as a quick response (Q) code, a radio-frequency identification ("RFID") tag, an NFC tag, or the like, or an active communication interface, such as a modem, a transceiver, a transmitter-receiver, or the like.

The wireless communication devices 110 represent cellular users (generally designated 120), devices in a healthcare environment (generally designated 130), connected cars (generally designated 140), devices in a smart home/office environment (generally designated 150) and devices in an automation environment (generally designated 160). The communication system 100 also includes one or more radio access nodes (one of which is designated 170) such as eNodeBs, gNBs or other base stations capable of communicating with the wireless communication devices 110 along with any additional elements suitable to support communication between wireless communication devices 110 or between a wireless communication device 110 and another communication device (such as a landline telephone). The radio access node 170 is also coupled to a core network 180 such as an Internet protocol ("IP") based network. The communication system can enable ubiquitous coverage and roaming capability, and cellular-based MTC is considered to be a key enabler of the networked society.

Although the illustrated wireless communication devices 110 may represent communication devices that include any suitable combination of hardware and/or software, the wireless communication devices 110 may, in particular embodiments, represent devices such as the example wireless communication device illustrated in greater detail by FIG. 2. Similarly, although the illustrated radio access node 120 may represent network nodes that include any suitable combination of hardware and/or software, these nodes may, in particular embodiments, represent devices such as the example radio access node illustrated in greater detail by FIG. 3.

As shown in FIG. 2, the example wireless communication device 200 includes a processor (or processing circuitry) 210, a memory 220, a transceiver 230, antenna(s) 240 and a battery 250. In particular embodiments, some or all of the functionality described above as being provided by MTC or M2M devices, and/or any other types of wireless communication devices may be provided by the device processor executing instructions stored on a computer-readable medium, such as the memory shown in FIG. 2. Alternative embodiments of the wireless communication device 200 may include additional components beyond those shown in FIG. 2 that may be responsible for providing certain aspects of the device's functionality, including any of the functionality described above and/or any functionality necessary to support the solution described herein.

As shown in FIG. 3, the example radio access node 300 includes a processor (or processing circuitry) 310, a memory 320, a transceiver 330, a network interface 340 and antenna(s) 350. In particular embodiments, some or all of the functionality described herein may be provided by a base station, a node B, an enhanced node B, a base station controller, a radio network controller, a relay station and/or any other type of network node may be provided by the node processor executing instructions stored on a computer-readable medium, such as the memory shown in FIG. 3. Alternative embodiments of the radio access node 300 may include additional components responsible for providing additional functionality, including any of the functionality identified above and/or any functionality necessary to support the solution described herein.

The processors, which may be implemented with one or a plurality of processing devices, performs functions associated with its operation including, without limitation, precoding of antenna gain/phase parameters, encoding and decoding of individual bits forming a communication message, formatting of information and overall control of a respective communication device. Exemplary functions related to management of communication resources include, without limitation, hardware installation, traffic management, performance data analysis, configuration management, security, billing and the like. The processors may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memories may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication device to perform its intended tasks. Of course, the memories may form a data buffer for data transmitted to and from the same. Exemplary embodiments of the system, subsystems, and modules as described herein may be implemented, at least in part, by computer software executable by processors, or by hardware, or by combinations thereof.

The transceivers modulate information onto a carrier waveform for transmission by the respective communication device via the respective antenna(s) to another communication device. The respective transceiver demodulates information received via the antenna(s) for further processing by other communication devices. The transceiver is capable of supporting duplex operation for the respective communication device. The network interface performs similar functions as the transceiver communicating with a core network.

In a paper by A. Gotsis, A. Lioumpas, and A. Alexiou, entitled "M2M scheduling over LTE: Challenges and new perspectives," IEEE Vehicular Technology Magazine, vol. 7, no. 3, pp. 34-39, September 2012, which is incorporated herein by reference, MTC scheduling challenges over LTE networks are described. Energy efficiency in MTC over LTE networks has been studied as described in the paper by K. Wang, J. Alonso-Zarate, and M. Dohler, entitled "Energy-efficiency of LTE for small data machine-to-machine communications," IEEE International Conference on Communications, pp. 4120-4124, 2013, which is incorporated herein by reference. It was shown that the existing communication procedures are not selected for small data communications.

A recent literature study on proposed LTE scheduling algorithms for MTC traffic reveals that most proposed MTC scheduling algorithms (such as described in the paper by M. Mehaseb, Y. Gadallah, A. Elhamy, and H. El-Hennawy, entitled "Classification of LTE uplink scheduling techniques: An M2M perspective," IEEE Communications Surveys Tutorials, no. 99, 2015, which is incorporated herein by reference) are an overlay to human-oriented communications (i.e., the remaining resources from serving HoC traffic are allocated to MTC). Additionally, the MTC scheduling algorithms vary in definition of a priority metric used to select a device for scheduling. Regarding the scheduling metric, existing algorithms could be categorized into four main categories such as channel-based schedulers, where devices with the highest signal-to-noise ratio ("SNR") are prioritized to maximize system throughput; delay-based schedulers, where traffic with the lowest delay budget is prioritized in scheduling; fairness-based schedulers, in which a fair distribution of radio resources among devices is guaranteed; and hybrid schedulers, in which a combination of the aforementioned metrics as well as other metrics such as buffer status are considered.

Defining new QCIs for MTC traffic has been investigated as described in a paper by Aghmadi, Ali, et al. entitled "A MTC traffic generation and QCI priority-first scheduling algorithm over LTE," Wireless Networks and Mobile Communications (WINCOM), 2015 International Conference on IEEE, 2015, and in U.S. patent application Ser. No. 13/900, 709 (the "'709 Application") entitled "Resource scheduling in a mobile communication network supporting machine-to-machine (m2m) and user equipment (ue) traffic," by Abdalla, Isam, both of which are incorporated herein by reference. In the paper by Aghmadi, Ali, et al., a new QCI for mission-critical MTC is introduced to let high-priority traffic from machines be served with the highest priority over cellular networks. In the '709 Application, three quality classes are defined for MTC traffic, where two classes are intended for delay-intolerant applications and one class is intended for delay-tolerant applications.

The number of connected machine-type devices in the year 2020 is forecasted to become nearly seven billion, as described in a Cisco document entitled "Cisco visual networking index: Global mobile data traffic forecast update, 20142019," Tech. Rep., March 2015, which is incorporated herein by reference. Enabling durable, substantial MTC over cellular networks is an opportunity for mobile network operators to decrease their revenue gap. The expected MTC traffic characteristics (e.g., extensive concurrent access, infrequent data generation, and short payload size) are way different from the ones of HoC and, hence, they don't match well with previously defined QCIs in 3GPP standards. Then, defining MTC-specific QCIs is a step in accommodating MTC traffic in cellular networks. Regarding the diverse set of QoS requirements of MTC services, however, defining new QCIs is rather complex. As many of the MTC type devices will be energy limited with no recharging ability, it is important to consider the battery lifetime of these devices when designing data communication networks. This is important for MTC applications that employ less human intervention such as data gathering sensor deployment, where the maintenance costs for monitoring the network and replacing devices/batteries is high.

To motivate big customers to deploy their machine-type devices over cellular networks providing/guaranteeing a good estimate of the battery-lifetime will advantageous. Although the research and standardization works have considered the extensive access issue, the battery lifetime and energy consumption management have not been considered in the management of machine-type communications. As an example, as described in the paper by M. Mehaseb, et al., throughput, fairness, and spectral efficiency have been frequently used metrics in scheduler designs for MTC. A battery status (e.g., remaining energy of batteries) has not been used as a metric for schedulers allocating resources to user equipment ("UE") or the like. Current schedulers do not provide lifetime-aware communications management, which affects the activity period of devices, their allocated uplink resources, amount of data to be transmitted, etc., and can significantly contribute to prolonging battery lifetime of battery-limited devices in cellular connectivity.

A battery lifetime-aware connection management is introduced herein between battery-constrained devices and radio access nodes such as base stations ("BSs"). On the device (UE) side, a set of extra information may be determined, which is dependent upon battery status that is transmitted from the device to the base station. On the base station side, the solution introduced herein determines the optimal or at least an improved response to be provided to the device, which configures the device's communications characteristics (or rules) to prolong the life of the battery.

Additionally, a set of new MTC-specific QCIs (i.e., $Q_i \in S_{proposed}$) is introduced herein for energy-limited machine-type devices in cellular networks to take care of battery lifetimes of connected devices as well as the QoS of existing users. As different devices have different characteristics (e.g., battery storage level, data reporting period and payload size), each new QCI may provide a level of energy consumption per bit. The energy consumption term in the QCIs consists of sources of energy consumption in uplink communications such as admission control over RACH, and data transmission/acknowledgement reception over a physical uplink shared channel ("PUSCH")/physical downlink control channel ("PDCCH"). In comparison with the already existing guaranteed bit-rate ("GBR") QCIs in 3GPP TS 23.203 version 13.6.0 Release 13 (introduced above), the newly proposed QCIs are guaranteed joule per bit ("GJB") QCIs, and can be subsequently translated to the expected battery-lifetime of each machine-type device. The number of newly defined QCIs depends on the granularity of battery lifetime of the MTC services.

Analysis of existing (non-mission-critical) MTC serving strategies over cellular networks shows that MTC traffic is currently scheduled to be served using the remaining resources from serving HoC traffic or is scheduled to be served in dedicated resources to NB-IOT. Also, proposed and standardized media access control ("MAC") techniques for substantial MTC scenarios (e.g., access class barring ("ACB")), preserve QoS for HoC traffic at the cost of increasing delay and energy consumption of machine-type subscribers. Then, not only has the battery lifetime of energy-limited devices been neglected, but there is neither information on the expected lifetime of a deployed sensor available at the base station, nor a battery lifetime-aware resource and connection management scheme at the base station to manage the communications. This gap is addressed with introduction of battery lifetime-aware control management between the base station and battery-constrained devices.

Also, the GJB-based QCIs provide a powerful tool for designers to not only adapt the operation of the access network to the experienced bitrate/delay of HoC users, but also consider the coupling between base station's operation and the expected battery-lifetime of energy-limited connected devices. Introduction of the GJB-based QCIs adds battery lifetime-awareness to the design of cellular networks and will contribute to determine improved (or optimized) operation points of cellular networks. As changing batteries increases human interventions and introduces a maintenance cost to the customers, guaranteeing a battery lifetime for MTC devices is becoming more and more important for enabling substantial MTC services over communication networks such as cellular networks. Again, in order to motivate big customers to deploy their MTC solutions over cellular networks and, hence, to decrease the revenue gap for mobile network operators ("MNOs"), providing a reliable estimate of battery-lifetime is beneficial, and may be given by GJB-based QCIs. Using the proposed GJB-QCIs, MNOs can inform their customers about the expected battery lifetime of deployed MTC solution, which in turn allows customers to select the MTC solution that reduces their long-term maintenance costs.

Figure 4:
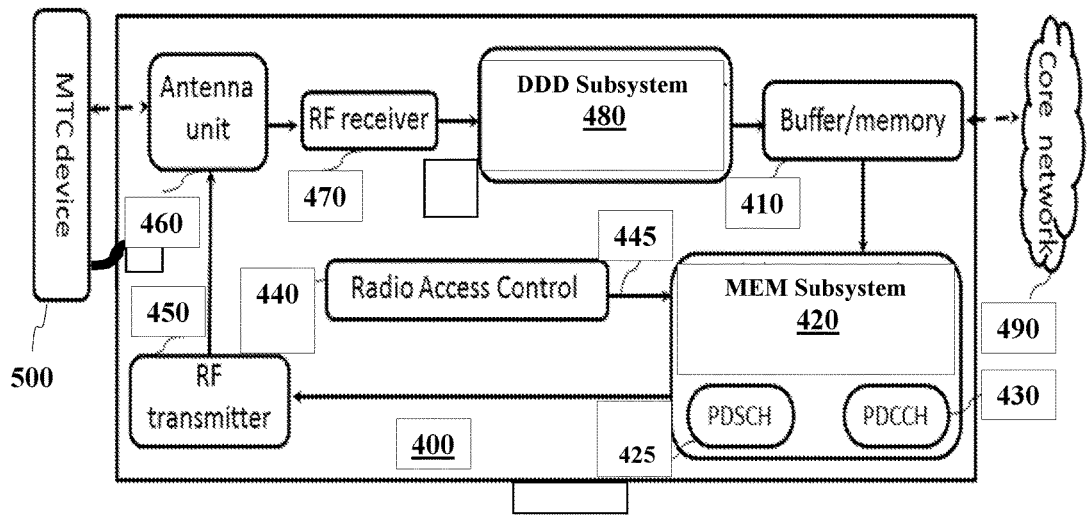
FIGS. 4 and 5 illustrate block diagrams of an embodiment of a communication system including subsystems within a radio access node and user equipment, respectively.
Figure 5:
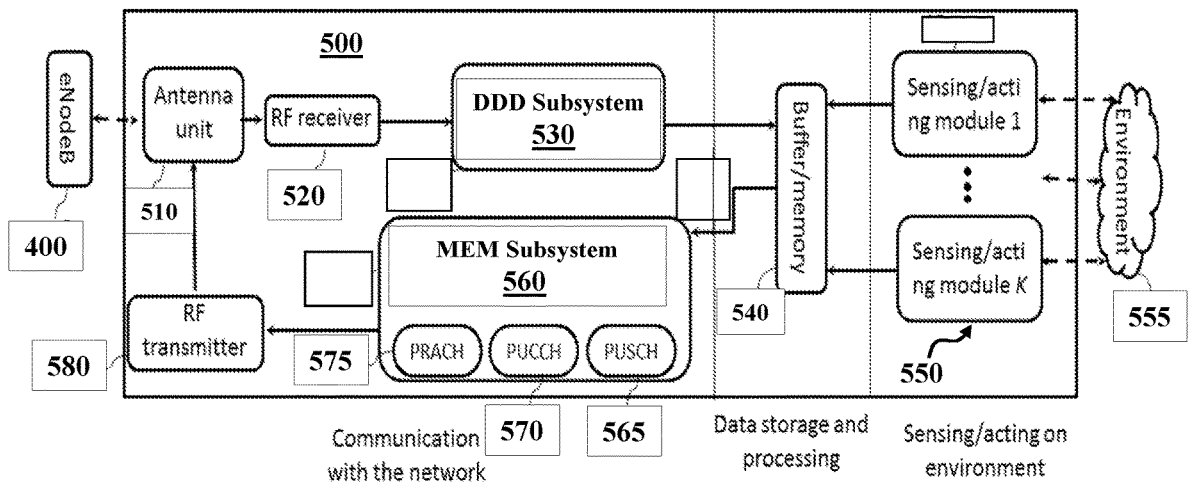

Turning now to FIGS. 4 and 5, illustrated are block diagrams of an embodiment of a communication system including subsystems within a radio access node (e.g., an eNodeB) 400 and user equipment (e.g., a MTC device) 500, respectively. The radio access node 400 includes a buffer/memory 410, a modulator/encoder/multiplexer ("MEM") subsystem 420 (associated with a physical downlink shared channel ("PDSCH") 425 and a physical downlink control channel ("PDCCH") 430), a radio access control unit 440, a radio frequency ("RF") transmitter 450, an antenna unit 460, and RF receiver 470, and a demodulator/decoder/demultiplexer ("DDD") subsystem 480. Of course, portions of the subsystems introduced herein are operable on a processor such as a baseband processor. The radio access node 400 is coupled to the user equipment 500 and a core network 490.

Starting with the downlink, the received data from the core network 490 is stored at the buffer/memory 410, and then based on scheduling commands 445 sent by the radio access control unit 440, the stored data is encoded, modulated, and multiplexed in connection with the PDSCH and PDCCH 425, 430 associated with the MEM subsystem 420. Data then passes through the RF transmitter 450 and is sent to the user equipment 500 via the antenna unit 460. On the uplink, data is received from the user equipment 500 at the RF receiver 470 via the antenna unit 460. The data is then demodulated, decoded and demultiplexed at the DDD subsystem 480, and passed to the buffer/memory 410 in preparation for the core network 490.

An RF receiver 520 of the user equipment 500 is coupled to the radio access node 400 via an antenna unit 510. The RF receiver 520 is coupled to a demodulator/decoder/demultiplexer ("DDD") subsystem 530, which is coupled to a buffer/memory 540 and sensing/acting modules (one of which is designated 550). The sensing/acting modules 550 interact with the environment 555. The buffer/memory 540 is also coupled to a modulator/encoder/multiplexer ("MEM") subsystem 560, which is associated with a physical uplink shared channel ("PUSCH") 565, a physical uplink control channel ("PUCCH") 570 and a physical random access channel ("PRACH") 575. The MEM subsystem 560 is also coupled to a RF transmitter 580 and the antenna unit 510. Of course, portions of the subsystems introduced herein are operable on a processor such as a baseband processor.

The transmitted data to the user equipment is received at the RF receiver 520 via the antenna unit 510, and then passes through the DDD subsystem 530 for processing to be stored in the buffer/memory 540 for further possible actions on the environment 555 via a sensing/acting module 550. On the uplink side, stored data in the buffer/memory 540 is modulated, encoded, and multiplexed, and passed to the RF transmitter 580 and radio access node 400 via the antenna unit 510.

Figure 6:
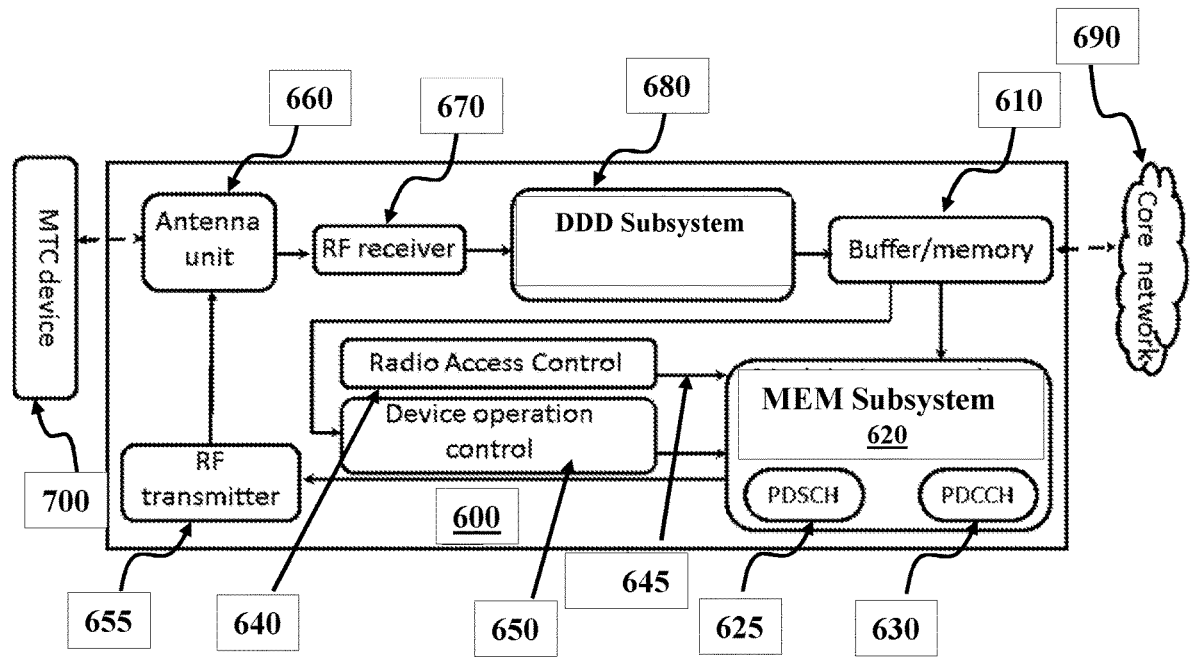
FIGS. 6 and 7 illustrate block diagrams of another embodiment of a communication system including subsystems within a radio access node and user equipment, respectively.
Figure 7:
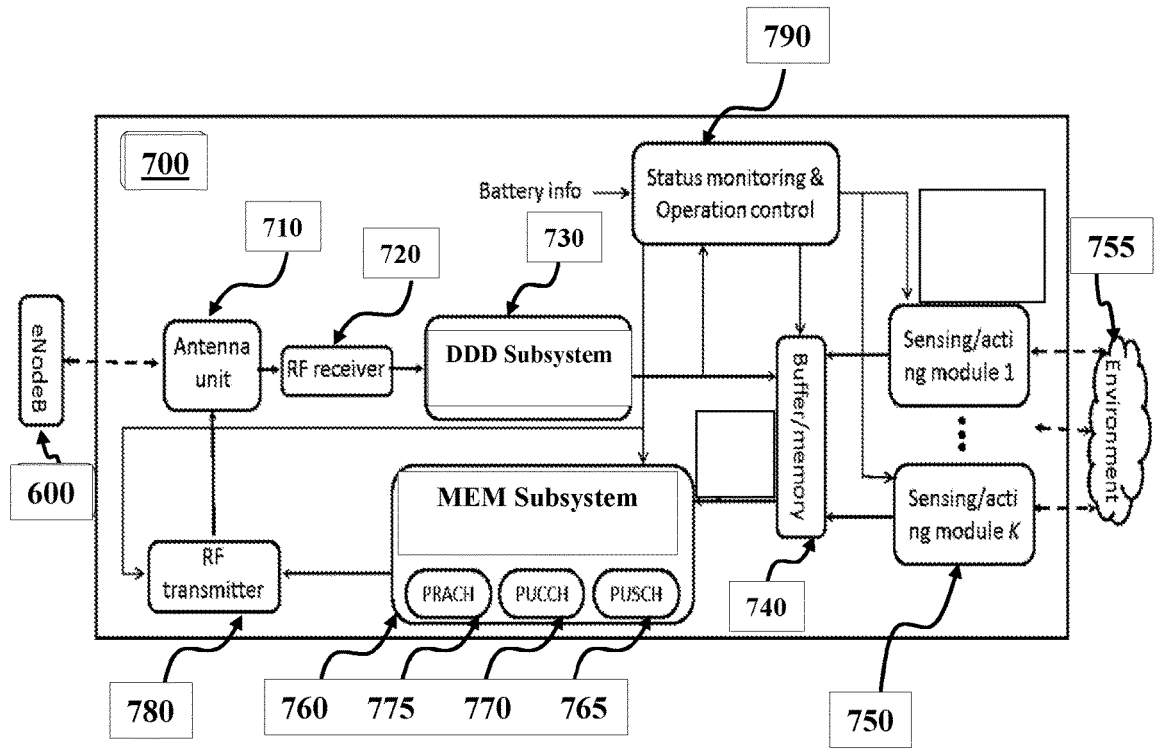

Turning now to FIGS. 6 and 7, illustrated are block diagrams of another embodiment of a communication system including subsystems within a radio access node (e.g., an eNodeB) 600 and user equipment (e.g., a MTC device) 700, respectively. The radio access node 600 includes a buffer/memory 610, a modulator/encoder/multiplexer ("MEM") subsystem 620 (associated with a physical downlink shared channel ("PDSCH") 625 and a physical downlink control channel ("PDCCH") 630), a radio access control unit 640, a device operation control unit 650, a radio frequency ("RF") transmitter 655, an antenna unit 660, an RF receiver 670, and a demodulator/decoder/demultiplexer ("DDD") subsystem 680. Of course, portions of the subsystems introduced herein are operable on a processor such as a baseband processor. The radio access node 600 is coupled to the user equipment 700 and a core network 690.

Starting from the downlink, the received data from the core network 690 is stored at the buffer/memory 610, and then based on the scheduling commands 645 sent by the radio access control unit 640, the stored data is encoded, modulated, and multiplexed in connection with the PDSCH and PDCCH 625, 630 associated with the MEM subsystem 620. Data then passes through the RF transmitter 655 and is sent to the user equipment 700 via the antenna unit 660. On the uplink, data is received from the user equipment 700 at the RF receiver 670 via the antenna unit 660. The data is then demodulated, decoded and demultiplexed at the DDD subsystem 680, and passed to the buffer/memory 610 in preparation for the core network 690.

The radio access node 600 also includes the device operation control unit 650 that accesses the buffer/memory 610. The buffer/memory 610 contains information received from user equipment 700 related to lifetime-aware communications management therewith. For example, the information includes, without limitation, a status associated with a battery of the user equipment 700 such as a remaining charge in the battery and other factors including an environment of the user equipment 700 such as a temperature and/or an altitude, a received signal strength indicator of the user equipment 700, and a buffer size of the user equipment 700. The device operation control unit 650 transfers data to the MEM subsystem 620 that performs the modulation, encoding, and multiplexing of data to enable the same to manage or otherwise control the PDSCH 625 and the PDCCH 630. The MEM subsystem 620 configures communication characteristics with the user equipment 700 so that its battery charge lasts as long as reasonably possible.

The radio access node 600 (via, for instance, the device operation control unit 650) can control the user equipment in accordance with a set of quality class identifiers ("QCIs"). The new set, called proposed QCIs $S_{proposed}$ is designed to capture the communications characteristics and requirements of existing user equipment, mission critical MTC devices, and battery lifetime demanding MTC devices. To keep backward compatibility, the proposed QCIs $S_{proposed}$ contain previously standardized QCIs and new QCIs for the MTC devices (see examples in TABLE 1 below).

TABLE 1

| QCI | Resource Type | Priority Level | Expected Joule/Bit | Expected Battery Lifetime | Example Application |
|---|---|---|---|---|---|
| 10 | GJB | 1 | 0.0025 | 10.9 years | Remote Data Acquisition |
| 11 | GJB | 2 | 0.025 | 1.09 years | Wearable Sensor |

In TABLE 1, two guaranteed joule-per-bit QCIs are presented, which ensure more than 10 years and one year of battery lifetime for a device. The device has a battery capacity of 1000 joules, reporting period of one day, static energy consumption of one millijoule per reporting period, and a data payload size of 100 bits per reporting period. The coupling between GJB and battery lifetime will be discussed below.

In most reporting MTC applications, packet generation at each device is modeled as a Poisson process. Thus, energy consumption of a device can be seen as a semi-regenerative process where the regeneration point is evident at the end of each successful data transmission. Assume at time $t_0$, a regeneration point, device i has battery storage of $E_i(t_0)$. Also, the reporting period for this device is $T_i$, static energy consumption per reporting period is $E_i^s$, and data payload size is $D_i$. Then, in the case that the device is served with quality class $Q_i$, its expected battery lifetime is derived as:

$$L_i = \frac{E_i(t_0)}{E_i^s + D_i Q_i} T_i.$$

In the following section, we investigate how implementing lifetime-aware QCIs can allow access networks to improve (or optimize) their operations based on the lifetime of MTC devices.

Let us assume uplink resource scheduling for a set $\Gamma$ of machine devices at time $t_0$, where i* denotes the set of devices to be scheduled at time $t_0$ by $\Gamma$, and the quality class of device i as $Q_i$, where $i \in \Gamma$. Also, denoted by $w_i$, the index of current reporting period for device i, and by $E_i^c(j)$, $\forall j \in \{1, \ldots, K\}$, the energy consumption of device i at reporting period $w_i - j$ for communications (e.g., when radio is on during connection establishment to termination in FIG. 9). Based on these definitions, the lifetime-aware scheduler can be implemented as follows:

$$i^* = \max_{i \in \Gamma} \frac{\frac{1}{K}\sum_{j=1}^{K} E_i^c(j)}{K D_i} - Q_i.$$

Returning now to FIG. 7, an RF receiver 720 of the user equipment 700 is coupled to the radio access node 600 via an antenna unit 710. The RF receiver 720 is coupled to a demodulator/decoder/demultiplexer ("DDD") subsystem 730, which is coupled to a buffer/memory 740 and sensing/acting modules (one of which is designated 750). The sensing/acting modules 750 interact with the environment 755. The buffer/memory 740 is also coupled to modulator/encoder/multiplexer ("MEM") subsystem 760, which is associated with a physical uplink shared channel ("PUSCH") 765, a physical uplink control channel ("PUCCH") 770 and a physical random access channel ("PRACH") 775. The MEM subsystem 760 is also coupled to a RF transmitter 780 and the antenna unit 710. The user equipment 700 also includes a status monitoring and operation control unit 790. Of course, portions of the subsystems introduced herein are operable on a processor such as a baseband processor.

The status monitoring and operation control unit 790 receives data from the DDD subsystem 730 (e.g., from the radio access node 600) related to managing a remaining charge in a battery in the user equipment 700. The status monitoring and operation control unit 790 provides control signals to the buffer/memory 740 and a plurality of the sensing/acting modules 750. The sensing/acting modules 750 are coupled to sensors that sense characteristics of an environment of the user equipment 700 such as, without limitation, a temperature, a location and an altitude. The buffer/memory 740 provides the sensed environmental data from the environment 755 to the MEM subsystem 760 that is coupled, in turn, to the RF transmitter 780. The RF transmitter 780 is coupled to the antenna unit 710 for transmission to the radio access node 600. In this manner, the environmental data of the user equipment 700 is transmitted to the radio access node 600. Thereby, the radio access node 600 is enabled to configure communication characteristics (such as communication rules) of the user equipment 700 to extend or otherwise manage a remaining charge in its battery.

Figure 8:
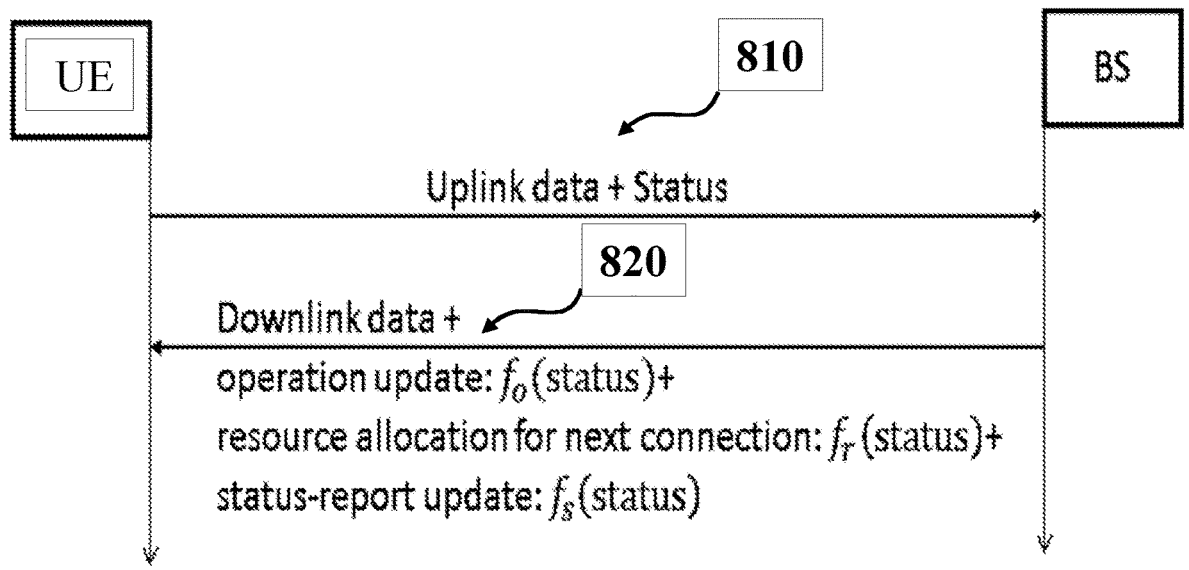
FIGS. 8 and 9 illustrate signaling diagrams of embodiments of methods of operating a communication system.

Turning now to FIG. 8, illustrated is a signaling diagram of an embodiment of a method of operating a communication system. The communication system includes a user equipment (designated "UE") and a radio access node (e.g., a base station designated ("BS")) and demonstrates status data transfer, resource allocation, and operation update therebetween. The user equipment provides requested data (e.g., uplink data and status 810) by a UE application to the radio access node. This status may include location and altitude data (for non-static devices), received signal strength indicator ("RSSI"), operational conditions such as temperature, buffer size, and remaining battery charge with predefined resolution by the radio access node.

In response to this data, the radio access node provides a set of operational points (such as communication rules 820) for the user equipment that extends remaining charge of a battery therein. The operational points 820 include, without limitation, downlink data, operational update, resource allocation for a next connection, and a status report update to the user equipment. The update-message may include, as necessary, optimizing functions $f_u$, $f_s$, $f_o$ used for UE resource allocation purposes such as an update in reporting period of the device (e.g., from one message per hour to one message per day), an update in types of data to be gathered from the environment (e.g., from temperature and humidity to only temperature), and an update in types of actions to be performed on the environment in the case of actuators.

Also, a response from the radio access node may include information on allocated resources for the user equipment for a next communication session. For example, for an energy-limited user equipment, the radio access node may decide to handle next-time synchronization of the device using collision-free preambles. Furthermore, it may allocate the next time communication slot in a region in the time/frequency plan in which interference from other nodes is reduced or minimized and, hence, the energy consumption of the device can be reduced or minimized.

Furthermore, the radio access node may inform the user equipment of the remaining battery resolution, i.e., a precision with which remaining battery charge is transmitted to the radio access node. As the length of status information to be transmitted from the user equipment to the radio access node should be as short as possible, the remaining-battery resolution is not constant during the lifetime of the user equipment and, hence, the radio access node may request more resolution on battery charge for battery limited devices to take more care.

The radio access node's message to the user equipment may include a selected modulation and coding protocol and transmit power to be used in the uplink communication, as well as the buffered data that has priority to be transmitted in the next time period. Using this set of data provided by the radio access node, each device configures its operation and communications. In addition to sending the update message to the user equipment, the radio access node saves the allocated resources for the user equipment, and takes the necessary steps to make sure the communications will be successful. For example, in case of an energy-critical node that the radio access node has informed the user equipment to send data with a lower transmit power, the radio access node considers a time/frequency place of allocated resource slot to the device to make it free (or mostly free) from interference, and beamforming directed to the device position, if possible, to increase the link communication budget.

In another embodiment, the radio access node can derive the expected battery lifetime of a user equipment (see, e.g., description above with respect to FIGS. 6 and 7). This expected battery lifetime is a factor that is used, for example, in functions $f_o$, $f_u$, $f_s$ that may be employed in finding new optimized or at least improved operational points of a device as described herein. Additionally, the radio access node can estimate the energy consumption for every transmission or delivered messages and maintain authentication from previous sessions such the next communication can be limited to data during a selected or special timeslot. Also, the radio access node may obtain data from many user equipment (e.g., MTC devices) in an attempt to prolong the battery lifetimes thereof.

Figure 9:
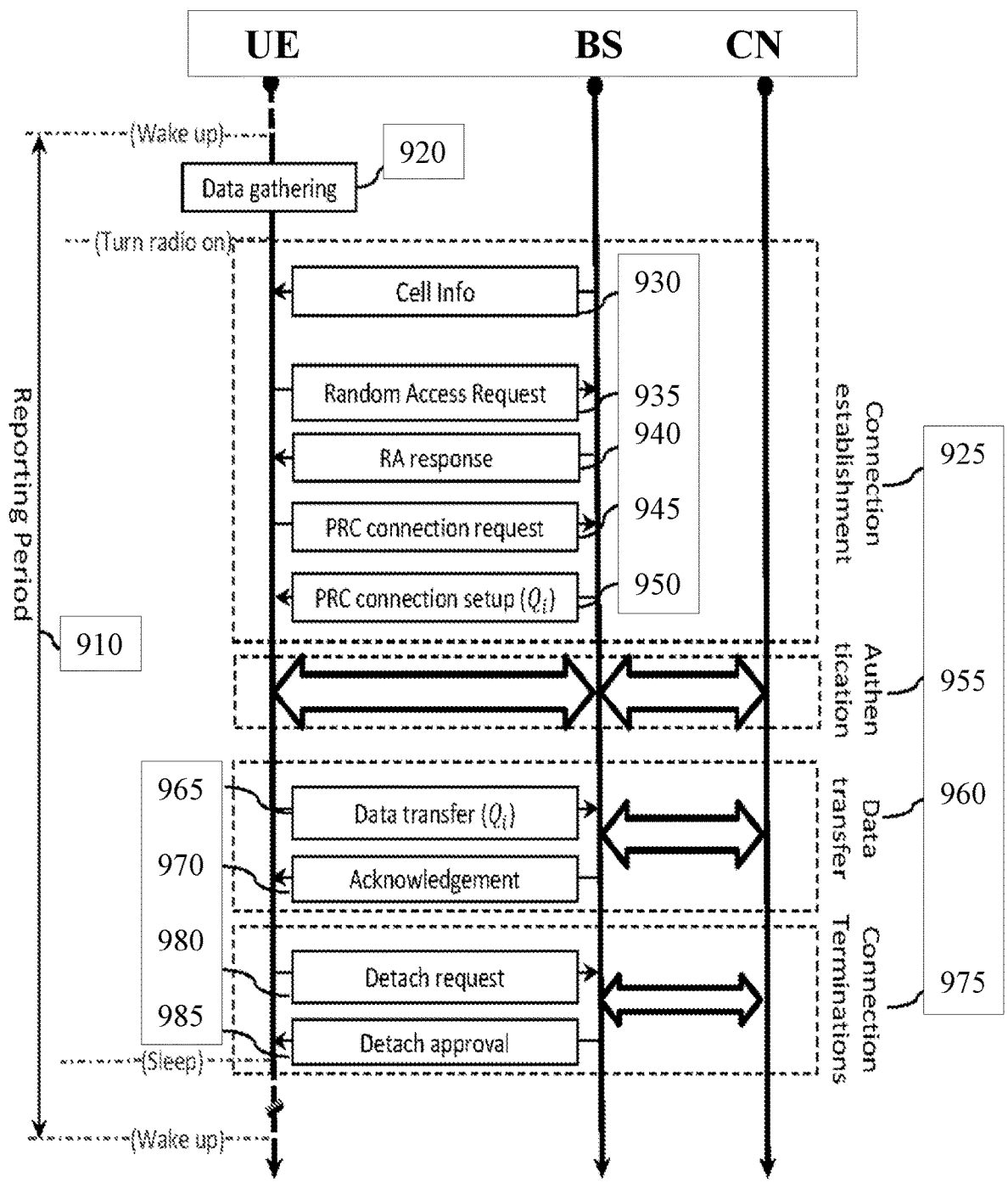

Turning now to FIG. 9, illustrated is a signaling diagram of an embodiment of a method of operating a communication system. The communication system includes a user equipment (designated "UE"), a radio access node (e.g., a base station designated "BS") and a core network (designated "CN") and demonstrates the operation during one reporting period 910. After the user equipment wakes up, the user equipment gathers data 920 from its environment. The user equipment and radio access node then establish a connection 925 including providing cell information 930 to the user equipment (via, for instance, broadcast information for synchronization), requesting random access 935 from the radio access node, providing a random access response 940 to the user equipment, requesting a primary reference clock ("PRC") connection 945 from the radio access node and providing a PRC connection setup 950 to the user equipment.

The user equipment, radio access node and core network then perform an authentication procedure 955, followed by a data transfer 960. As part of the data transfer 960, the user equipment transfers data 965 to the radio access node (and ultimately the core network), and the radio access node responds with an acknowledgement 970. Following the data transfer 960, a connection termination 975 is performed between the user equipment, radio access node and core network. The connection termination 975 includes a detach request 980 from the user equipment, which is then approved 985 by the radio access node.

The admission control associated with the random access, authentication, and scheduled data transmission are major sources of energy consumption. Given the GJB class of a device, the radio access node can trigger lifetime-aware admission control, scheduling and authentication solutions, to ensure (or substantially ensure) the guaranteed joule-per-bit, and hence the expected battery lifetime, for a device is satisfied. As an example, see the battery lifetime-aware scheduling set forth above with respect to FIGS. 6 and 7.

Figure 10:
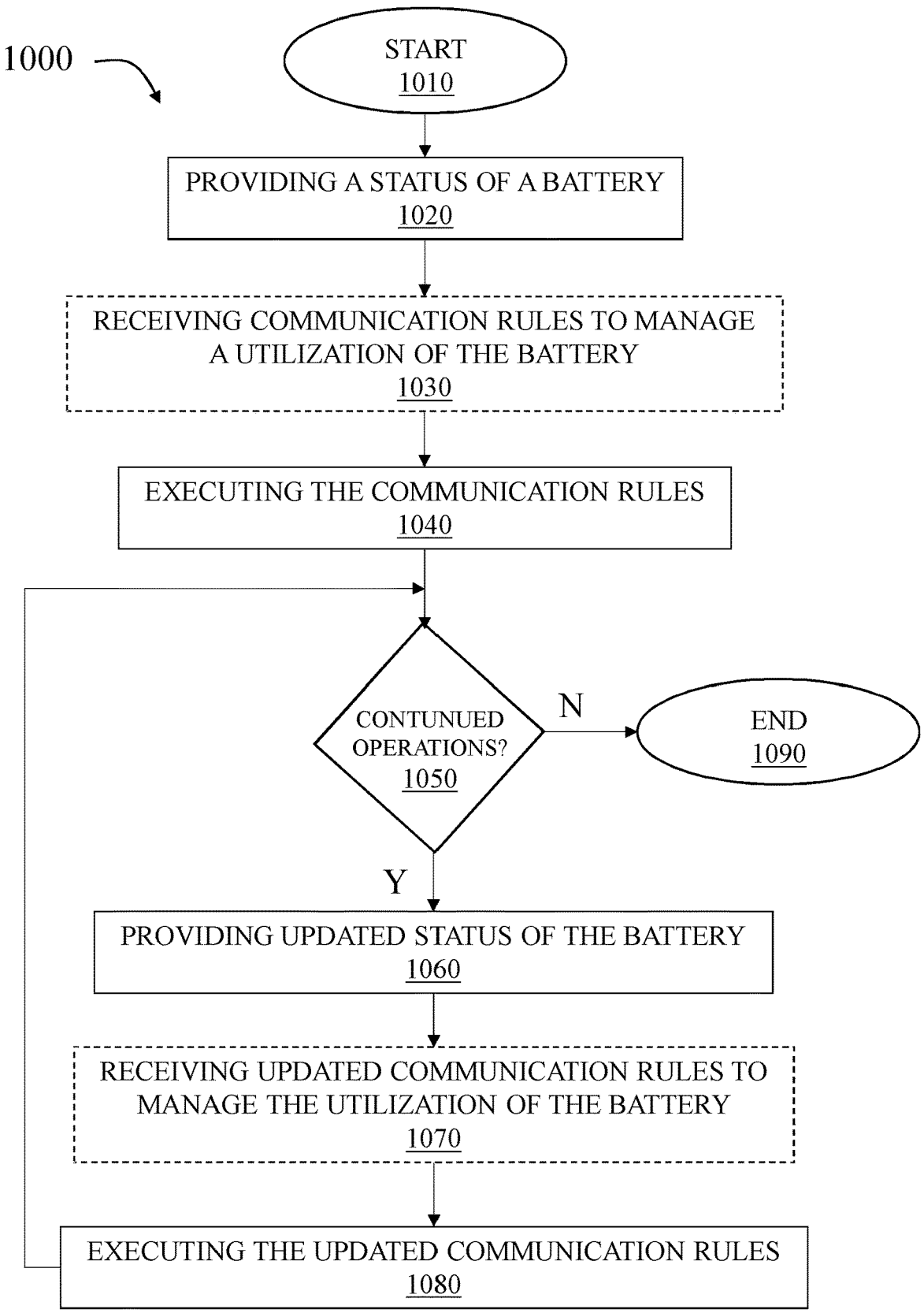
FIGS. 10 to 12 illustrate flow diagrams of embodiments of methods of operating a communication system.

Turning now to FIG. 10, illustrated is a flow diagram of an embodiment of a method 1000 of operating a communication system. The method 1000 is operable on a user equipment such as a machine-type communication device and begins at a start step or module 1010. The method 1000 includes providing a status associated with a battery of the user equipment at a step or module 1020. The status associated with the battery of the user equipment includes, without limitation, a remaining charge of the battery and other factors including an environment of the user equipment, a received signal strength indictor of the user equipment, and a buffer size of the user equipment.

At an optional step or module 1030, the method 1000 includes receiving communication rules to manage a utilization of the battery based on the status associated with the battery from a radio access node such as a base station. The method 1000 also includes executing the communication rules to manage the utilization of the battery based on the status of the battery at a step or module 1040. The communication rules include, without limitation, a frequency of communications to and/or from the user equipment, a power level of communications to and/or from the user equipment, a message content of communications to and/or from the user equipment, a modulation and coding scheme for communications to and/or from the user equipment, and a beamforming procedure for communications to the user equipment.

At a decisional step or module 1050, the method 1000 determines if there are continued operations. The continued operations may include, without limitation, a change of conditions associated with the user equipment that affect the battery. If the operations are concluded (such as powering down), the method 1000 ends at a step or module 1090. Otherwise, the method 1000 includes providing an updated status associated with the battery of the user equipment at a step or module 1060, and receiving updated communication rules to manage the utilization of the battery based on the updated status associated with the battery from, for instance, a base station at an optional step or module 1070. The method 1000 also includes executing the updated communication rules to manage the utilization of the battery based on the updated status of the battery at a step or module 1080, and then returns to the decisional step or module 1050.

Figure 11:
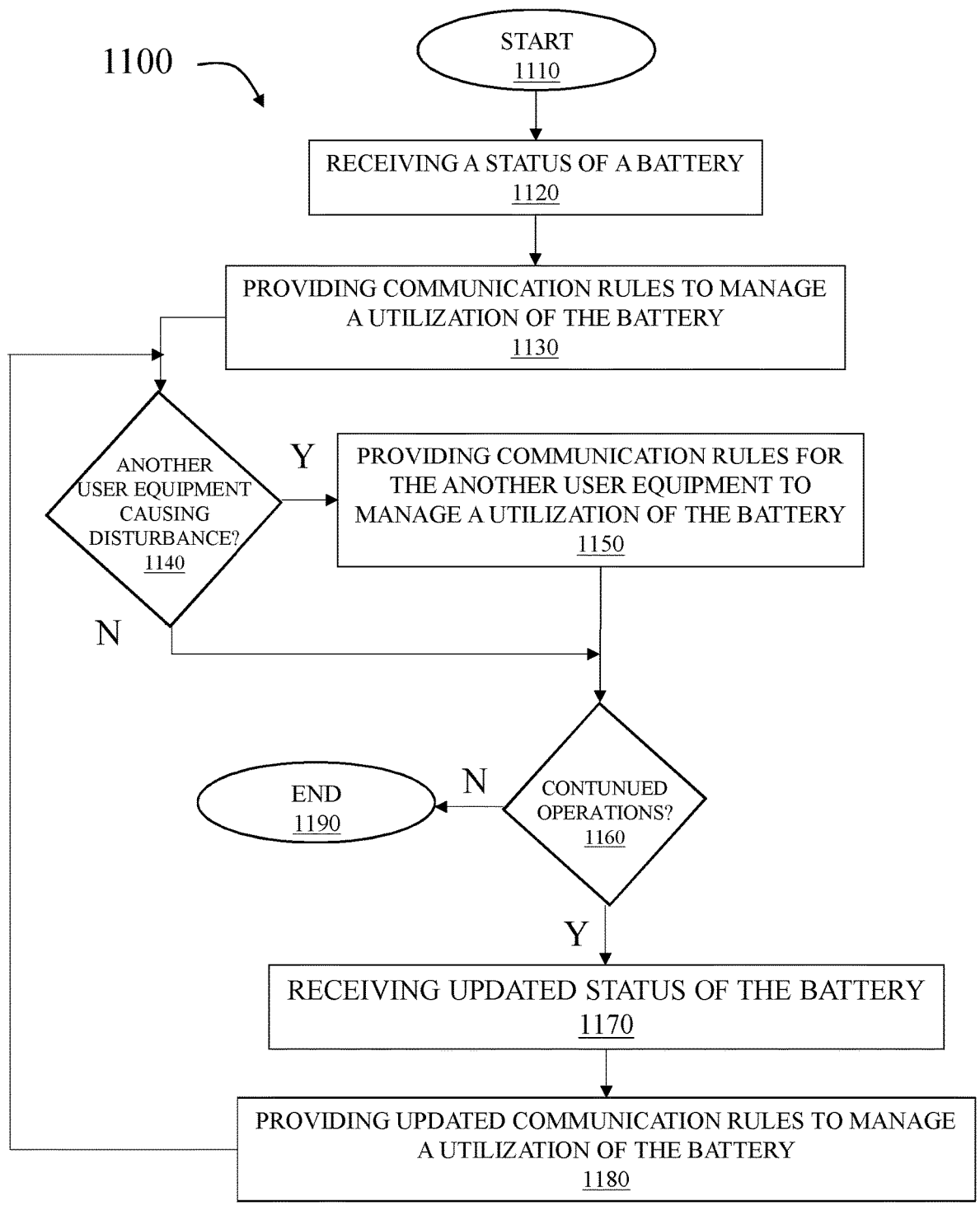

Turning now to FIG. 11, illustrated is a flow diagram of an embodiment of a method 1100 of operating a communication system. The method 1100 is operable on a radio access node such as a base station and begins at a start step or module 1110. The method 1100 includes receiving a status associated with a battery of the user equipment (e.g., a machine-type communication device) at a step or module 1120. The status associated with the battery of the user equipment includes, without limitation, a remaining charge of the battery and other factors including an environment of the user equipment, a received signal strength indictor of the user equipment, and a buffer size of the user equipment.

At a step or module 1130, the method 1100 includes providing communication rules for the user equipment to manage a utilization of the battery based on the status of the battery. The communication rules include, without limitation, a frequency of communications to and/or from the user equipment, a power level of communications to and/or from the user equipment, a message content of communications to and/or from the user equipment, a modulation and coding scheme for communications to and/or from the user equipment, and a beamforming procedure for communications to the user equipment.

At a decisional step or module 1140, the method 1100 determines if there is another user equipment disturbing an operation of the user equipment. For instance, the another user equipment may be causing interference with the user equipment that reduces the battery utilization of the user equipment. If another user equipment is not causing any disturbance, the method 1100 proceeds to a decisional step or module 1160, otherwise the method 1100 includes providing communication rules for the another user equipment (e.g., to reduce interference) to manage the utilization of the battery of the user equipment at a step or module 1150.

At the decisional step or module 1160, the method 1100 determines if there are continued operations. The continued operations may include, without limitation, a change of conditions associated with the user equipment that affect the battery. If the operations are concluded (such as powering down), the method 1100 ends at a step or module 1190. Otherwise, the method 1100 includes receiving an updated status associated with the battery of the user equipment at a step or module 1170, and providing updated communication rules for the user equipment to manage the utilization of the battery based on the updated status of the battery at a step or module 1180. The method 1100 then returns to the decisional step or module 1140.

Figure 12:
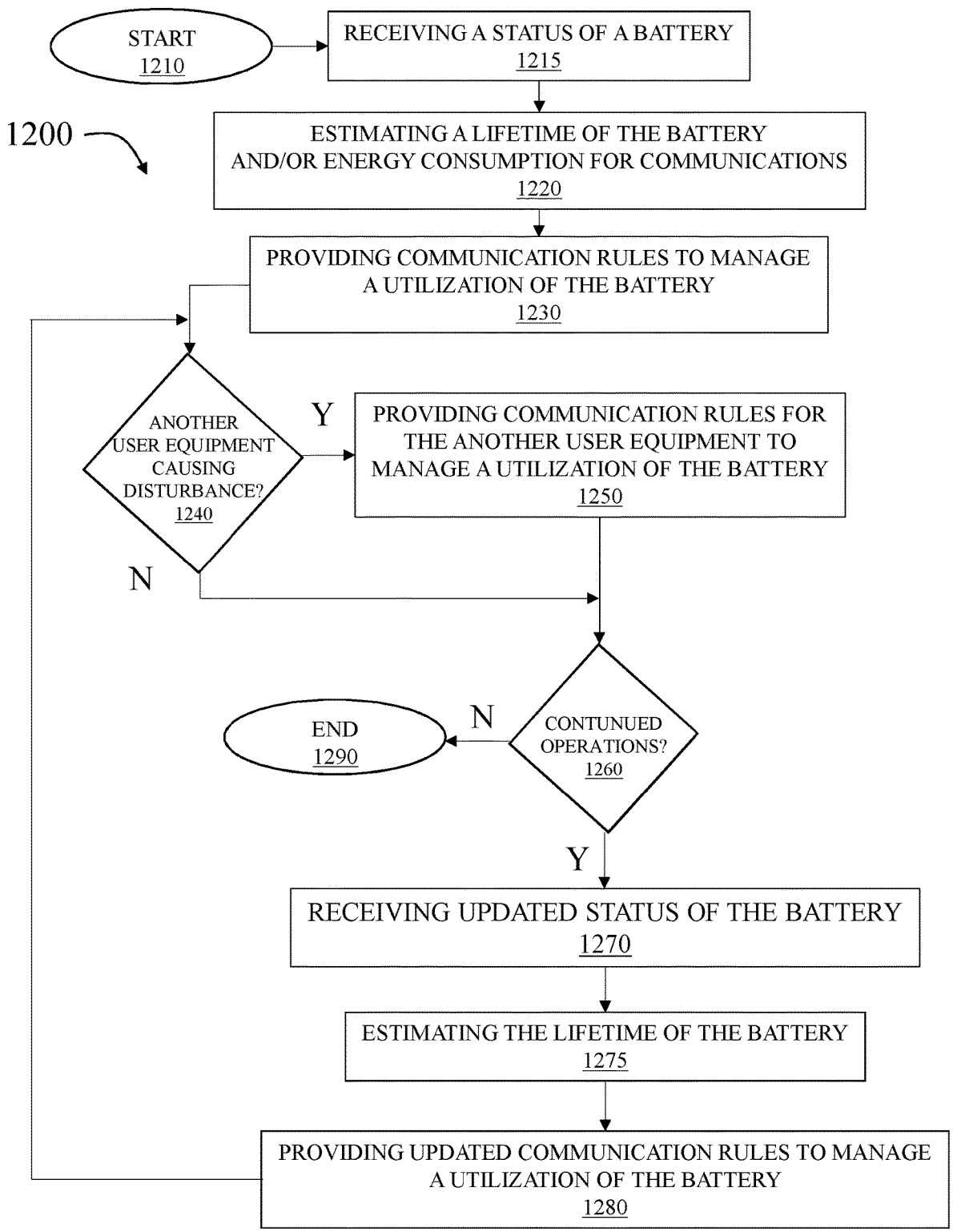

Turning now to FIG. 12, illustrated is a flow diagram of an embodiment of a method 1200 of operating a communication system. The method 1200 is operable on a radio access node such as a base station and begins at a start step or module 1210. The method 1200 includes receiving a status associated with a battery of the user equipment (e.g., a machine-type communication device) at a step or module 1215. The status associated with the battery of the user equipment includes, without limitation, a remaining charge of the battery and other factors including an environment of the user equipment, a received signal strength indictor of the user equipment, and a buffer size of the user equipment. Then, the method 1200 includes estimating a lifetime of the battery at a step or module 1220. The step or module 1220 may also include estimating an energy consumption for communications (e.g., every transmission or delivered messages) to be taken into account for communication rules for the user equipment.

At a step or module 1230, the method 1200 includes providing communication rules for the user equipment to manage a utilization of the battery based on the estimate of the lifetime and the status of the battery. The communication rules include, without limitation, a frequency of communications to and/or from the user equipment, a power level of communications to and/or from the user equipment, a message content of communications to and/or from the user equipment, a modulation and coding scheme for communications to and/or from the user equipment, and a beamforming procedure for communications to the user equipment. The communication rules may also include maintaining authentication from previous sessions such that the next communication can be limited to data during a selected or special timeslot. Also, the communication rules may take into account data from many user equipment (e.g., MTC devices) in an attempt to prolong the battery lifetimes thereof.

At a decisional step or module 1240, the method 1200 determines if there is another user equipment disturbing an operation of the user equipment. For instance, the another user equipment may be causing interference with the user equipment that reduces the battery utilization of the user equipment. If another user equipment is not causing any disturbance, the method 1200 proceeds to a decisional step or module 1260, otherwise the method 1200 includes providing communication rules for the another user equipment (e.g., to reduce interference) to manage the utilization of the battery of the user equipment at a step or module 1250.

At the decisional step or module 1260, the method 1200 determines if there are continued operations. The continued operations may include, without limitation, a change of conditions associated with the user equipment that affect the battery. If the operations are concluded (such as powering down), the method 1200 ends at a step or module 1290. Otherwise, the method 1200 includes receiving an updated status associated with the battery of the user equipment at a step or module 1270, and re-estimating the lifetime of the battery at a step or module 1275. At a step or module 1280, the method 1200 includes providing updated communication rules for the user equipment to manage the utilization of the battery based on the estimate of the lifetime and the updated status of the battery at a step or module 1280. The method 1200 then returns to the decisional step or module 1240.

In accordance with estimating the lifetime of the battery of the user equipment or device, the present embodiment may take into account GJB-based quality class identifiers ("GJB-QCIs"). The GJB-QCI set contains K joule/bit levels, e.g., {0.1,0.5,1}. Each member of the set provides the amount of energy that the device will consume in data communications over the network per bit of useful data to be transmitted. For example, in a network in which the device should reserve uplink resources, send data, and receive an acknowledgment, one joule/bit represents that for sending one bit of binary data over the network, it is expected that one joule of energy is consumed in access reservation, data transmission, and acknowledgement process. The term K refers to the cardinality of GJB-QCI set, which presents the joule/bit levels available in a network.

Potential objectives of the system described herein include, without limitation, augmenting (or maximizing) each device's battery lifetime, augmenting (or maximizing) minimum battery lifetime in the network, augmenting (or maximizing) average battery lifetime in the network, or augmenting (or maximizing) maximum battery lifetime in the network. Based on the defined objective, a mapping function estimates battery lifetime of the device based on the latest update received therefrom, and selects the communication rule that attempts to prolong the life of the battery of the device.

The set of available GJB-QCIs in a network depends on the traffic in the cell, cell topology, received interference from neighbor networks, and communication policy implemented in the network. An algorithm can receive this information and generate the set. The communication policy generally refers to the protocols that are applied in the communication of device with the communication system or network. For example, if access reservation is required or not; or if acknowledgment is required or not. The level of consumed energy in each stage of communication (e.g., access reservation) is estimated by the algorithm in order to see which bit/joule levels are available with the given network configuration.

Thus, as introduced herein, remaining energy of batteries is employed in resource allocation in a communication network such as a cellular network to improve performance and reduce costs of the rapidly growing and widely dispersed MTC services. Regarding the ever-increasing interest for realizing a connected society, cellular networks can be an enabler regarding the unique characteristics such as widespread availability. A key missing item in realizing massive connectivity via cellular networks or any other solution is recognized for prolonging the battery lifetime. Battery lifetime is understood to contribute significantly in maintenance cost. As introduced herein, battery lifetime-aware connection management is employed for MTC services over cellular networks.

Based on the description and illustrations provided hereinabove, the system offers a battery lifetime-aware MTC management for communication networks such as cellular networks, and determines an improved (or the optimized) set of operation information to be sent to the eNodeB (or radio access node) by the MTC devices (or user equipment) to enable the eNodeB to enhance (or optimize) its operation with respect to battery lifetime. The system also determines the size and coding of a status report to send to the eNodeB, determines functions $f_u$, $f_s$, $f_o$ used for MTC resource allocation purposes, and determines the set of operations at the eNodeB to make sure MTC communication will be successful with a given reliability level, e.g., by assigning a well suited QCI to the traffic originated from the device.

Implementation of the QCI also enables communication systems to augment (or optimize) their performance not only based on the QoS for HoC traffic (e.g., satisfying delay requirements), but also based on expected battery lifetime of user equipment such as machine devices. The communication systems may also be able to inform the MTC customers about the expected battery lifetime of the implemented devices.

While processes in the figures and description may show a particular order of operations performed by certain embodiments of the invention, it should be understood that such order is exemplary (e.g., alternative embodiments may perform the operations in a different order, combine certain operations, overlap certain operations, etc.).

As described above, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. An apparatus configured to communicate with a user equipment in a communication system, comprising:
a processor configured to:
receive a status associated with a user equipment, the status including a remaining charge associated with a battery of said user equipment and also including one or more of the following:
data about an environment in which said user equipment is operating,
an indicator of said user equipment's received signal strength, and
a buffer size of said user equipment; and
provide communication rules for said user equipment to manage a utilization of said battery based on said status.

2. The apparatus of claim 1, wherein said processor is further configured to:
estimate a lifetime of said battery; and
provide said communication rules for said user equipment to manage said utilization of said battery based on the estimated lifetime and said status.

3. The apparatus of claim 1, wherein:
said processor is further configured to provide communication rules for another user equipment to manage said utilization of said battery of said user equipment; and
said communication rules for said another user equipment are selected to reduce interference with said user equipment.

4. The apparatus of claim 1, wherein said processor is further configured to:
receive an updated status associated with said user equipment, and
provide updated communication rules for said user equipment to manage said utilization of said battery based on said updated status.

5. The apparatus of claim 4, wherein said processor is further configured to:
estimate a lifetime of said battery; and
provide said updated communication rules for said user equipment to manage said utilization of said battery based on the estimated lifetime and said updated status.

6. The apparatus of claim 1, wherein:
said communication rules include at least one of the following:
a frequency of communications to and/or from said user equipment,
a power level of communications to and/or from said user equipment,
a message content of communications to and/or from said user equipment,
a modulation and coding scheme for communications to and/or from said user equipment, and
beamforming procedure for communications to said user equipment.

7. The apparatus of claim 1, wherein:
said user equipment is a machine-type communication device; and
said apparatus is included in a base station.

8. A method performed by a base station in a communication system, the method comprising:
receiving a status associated with a user equipment, the status including a remaining charge associated with a battery of said user equipment and also including one or more of the following:
data about an environment in which said user equipment is operating,
an indicator of said user equipment's received signal strength, and
a buffer size of said user equipment; and
providing communication rules for said user equipment to manage a utilization of said battery based on said status.

9. The method of claim 8, further comprising:
estimating a lifetime of said battery; and
providing said communication rules for said user equipment to manage said utilization of said battery based on the estimated lifetime and said status.

10. The method of claim 8, further comprising providing communication rules for another user equipment to manage said utilization of said battery of said user equipment, wherein said communication rules for said another user equipment are selected to reduce interference with said user equipment.

11. The method of claim 8, further comprising:
receiving an updated status associated with said user equipment, and
providing updated communication rules for said user equipment to manage said utilization of said battery based on said updated status.

12. The method of claim 11, further comprising estimating a lifetime of said battery and providing said updated communication rules for said user equipment to manage said utilization of said battery based on the estimated lifetime and said updated status.

13. The method of claim 8, wherein:
said communication rules include at least one of the following:
a frequency of communications to and/or from said user equipment,
a power level of communications to and/or from said user equipment,
a message content of communications to and/or from said user equipment,
a modulation and coding scheme for communications to and/or from said user equipment, and
beamforming procedure for communications to said user equipment.

14. The method of claim 8, wherein said user equipment is a machine-type communication device.

15. An apparatus in a communication system, the apparatus comprising:
a processor configured to:
provide, to a base station, a status associated with the apparatus, the status including a remaining charge associated with a battery of said apparatus and also including one or more of the following:
data about an environment in which said apparatus is operating,
an indicator of said apparatus's received signal strength, and
a buffer size of said apparatus;
receive, from the base station, communication rules to manage a utilization of said battery based on said status; and execute said communication rules to manage said utilization of said battery based on said status.

16. The apparatus of claim 15, wherein said processor is further configured to:
provide an updated status associated with said apparatus;
receive, from the base station, updated communication rules to manage said utilization of said battery; and
execute updated communication rules to manage said utilization of said battery based on said updated status.

17. The apparatus of claim 15, wherein:
said communication rules include at least one of the following:
   a frequency of communications to and/or from said apparatus,
   a power level of communications to and/or from said apparatus,
   a message content of communications to and/or from said apparatus,
   a modulation and coding scheme for communications to and/or from said apparatus, and
   beamforming procedure for communications to said apparatus.

18. The apparatus of claim 15, wherein said apparatus is a machine-type communication device.

19. A method operable on an apparatus in a communication system, the method comprising:
providing, to a base station, a status associated with the apparatus, the status including a remaining charge associated with a battery of said apparatus and also including one or more of the following:
   data about an environment in which said apparatus is operating,
   an indicator of said apparatus's received signal strength, and
   a buffer size of said apparatus;
receiving, from a base station, communication rules to manage a utilization of said battery based on said status; and
executing said communication rules to manage said utilization of said battery based on said status.

20. The method of claim 19, further comprising:
providing an updated status associated with said apparatus;
receiving, from the base station, updated communication rules to manage said utilization of said battery; and
executing updated communication rules to manage said utilization of said battery based on said updated status.

21. The method of claim 19, wherein:
said communication rules include at least one of the following:
   a frequency of communications to and/or from said apparatus,
   a power level of communications to and/or from said apparatus,
   a message content of communications to and/or from said apparatus,
   a modulation and coding scheme for communications to and/or from said apparatus, and
   beamforming procedure for communications to said apparatus.

* * * * *